No. 845,496. PATENTED FEB. 26, 1907.
G. W. WHITEMAN.
INSULATED RAIL JOINT.
APPLICATION FILED SEPT. 14, 1905.
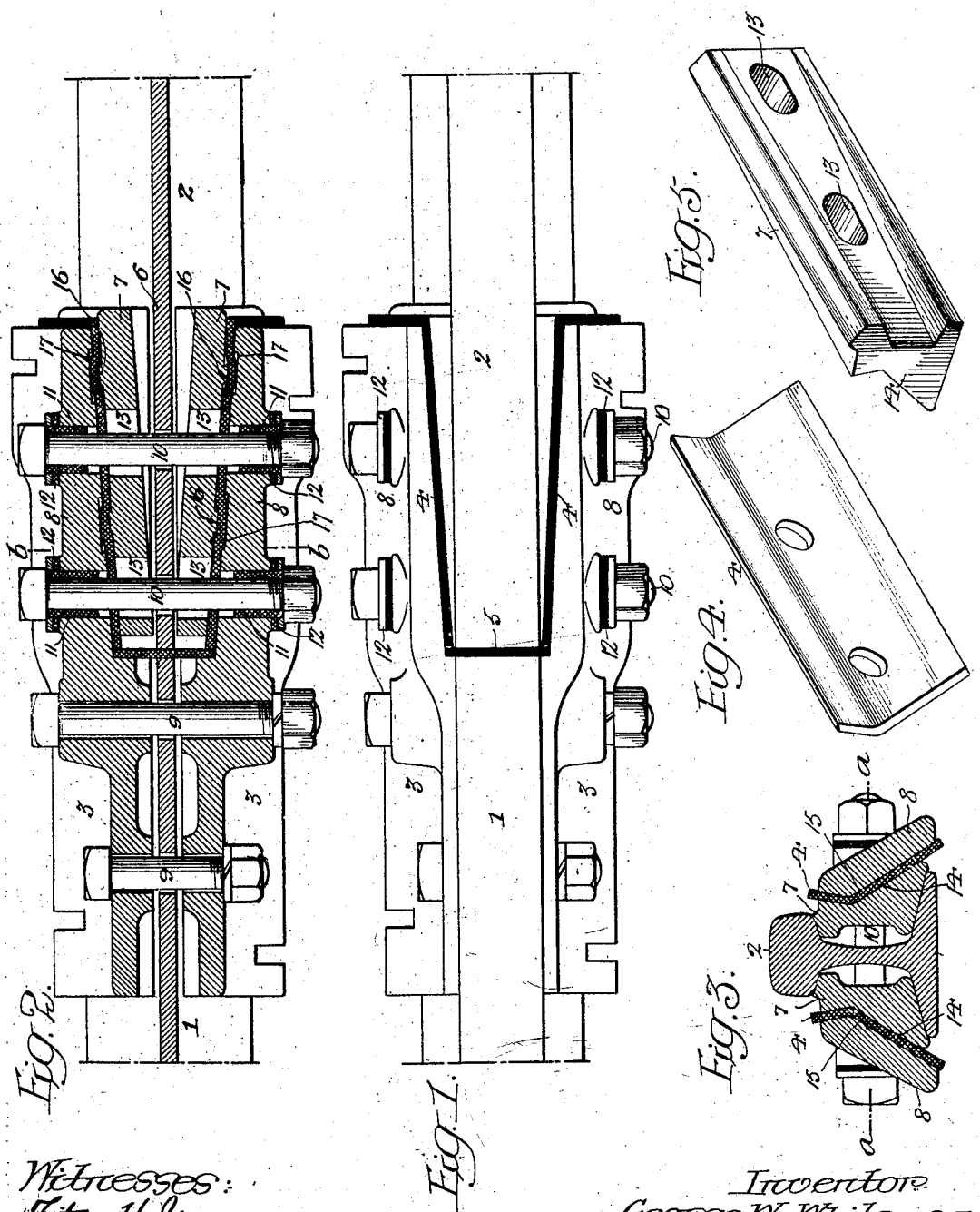

UNITED STATES PATENT OFFICE.

GEORGE W. WHITEMAN, OF PHILADELPHIA, PENNSYLVANIA.

INSULATED RAIL-JOINT.

No. 845,496.            Specification of Letters Patent.          Patented Feb. 26, 1907.

Application filed September 14, 1905. Serial No. 278,455.

*To all whom it may concern:*

Be it known that I, GEORGE W. WHITEMAN, a citizen of the United States, residing in Philadelphia, Pennsylvania, have invented certain Improvements in Insulated Rail-Joints, of which the following is a specification.

My invention relates to rail-joints, and consists of certain improvements in joints of this character having insulating material disposed between the meeting ends of the rails, the object of my invention being to simplify the construction of such joints, to provide one in which the wear can be readily taken up, and to provide a solid metal support for the receiving end of the rail.

My invention is fully shown in the accompanying drawing, in which—

Figure 1 is a plan view of a rail-joint made in accordance with my invention. Fig. 2 is a sectional plan view of the same, taken on the line *a a*, Fig. 3. Fig. 3 is a cross-sectional view taken on the line *b b*, Fig. 2. Fig. 4 is a perspective view of one of the insulating members, and Fig. 5 is a perspective view of one of the wedge-blocks.

In the joint forming the subject of my invention the insulation is confined solely to one of the meeting ends of the rails, and in combination with such insulation and the splice-bars, which are made so as to accommodate the same, I provide wedge-blocks capable of endwise movement for a limited extent to take up any wear that may occur at this point, such wedge-blocks serving also to provide a solid metal support for this end of the rail.

In my improved joint I insulate the meeting end of the rail nearest the point from which the traffic approaches on such line of rails, which rail I have designated as the "receiving-rail." In ordinary joints this end of the rail is depressed to a greater or less extent every time a train passes over the same, and this depression, especially in the case of insulated joints, causes a great deal of wear which must be compensated for and subjects the bolts connecting the splice-bars to a considerable amount of tension and strain. By tightening up the wedge-blocks employed in my improved joint I can take up the wear at this point and by disposing such blocks in engagement with the head and base of the rail I relieve the strain on the bolts.

In the drawing herewith, 1 and 2 represent the meeting ends of the rails, and 3 the fish-plates or splice-bars. Surrounding the rail end 2 is insulation in the form of longitudinal pieces 4, of hard rubber, parchmentized fiber, or other similar material, and a bridge-piece 5, of the same material, disposed directly between the meeting ends of the rails. Interposed between the web 6 of the rail end 2 and the longitudinal insulating-pieces 4 are the wedge-blocks 7, the fish-plates or splice-bars being extended laterally at 8 to accommodate the insulation and the wedge-blocks. The pieces of insulation are V-shaped in cross-section and the splice-bars and wedge-blocks have engaging faces of similar shape.

The joint is held in place by the usual bolts 9 and 10, the latter passing through the insulated portion and being provided with sleeves 11 of insulating material. Washers 12, of the same material, are placed under the heads and nuts of the bolts 10.

The holes 13 in the wedge-blocks through which the bolts 10 pass are elongated so that said wedge-blocks may be moved endwise when it is desired to take up wear upon this portion of the joint.

The wedge-blocks 7 have an angular outer face 12 between which and the face 13 of the splice-bars the insulating-pieces 4 are disposed. The wedge-blocks are disposed between the head and base of the rail, as clearly shown in Fig. 3, and the portion 8 of the splice-bars overlies the base of the wedge-blocks. By this construction a firm support is afforded at this end of the joint, relieving the tension usually falling upon the bolts. The wedge-blocks have projections 14, and the splice-bars have recesses 15 disposed opposite each other when the joint is assembled, as shown in Fig. 2. These parts coacting displace a portion of the insulating-pieces 4 confined between the same and prevent any creeping of said insulation.

Having thus described my invention, I claim and desire to secure by Letters Patent—

1. The combination, in an insulated rail-joint, of the meeting ends of the rails, splice-bars connecting said rails, insulating material embracing one of said rail ends and confined by said splice-bars, adjoining ends of each of the latter being deflected laterally to accommodate said insulating material, and wedging means in contact with the insulating material for taking up wear.

2. The combination, in an insulated rail-joint, of the meeting ends of the rails, splice-bars connecting said rail ends, insulating material embracing one of said rail ends and confined by the splice-bars, adjoining ends of each of the latter being deflected laterally to accommodate said insulating material, and wedging means embraced by said deflected portions for taking up wear and tightening said end of the joint.

3. The combination, in an insulated rail-joint, of the meeting ends of the rails, splice-bars connecting said rail ends, insulating material embracing one of said rail ends and confined by the splice-bars, adjoining ends of each of the latter being deflected laterally to accommodate said insulating material, and wedging means embraced by said deflected portions and interposed between the web of the rail and the insulating material for taking up wear at said end of the joint.

4. The combination, in an insulated rail-joint, of the meeting ends of the rails, insulating material embracing one of said rail ends, splice-bars connecting the rails and having one end enlarged to accommodate the insulating material, and wedge-blocks to take up the wear at said end of the joint.

5. The combination, in an insulated rail-joint, of the meeting ends of the rails, insulating material embracing one of said rail ends, splice-bars connecting the rails and having one end enlarged to accommodate the insulating material, and wedge-blocks interposed between said insulating material and the web of the rail to take up the wear at said end of the joint.

6. The combination, in an insulated rail-joint, of the meeting ends of the rails, splice-bars connecting said rails and having their adjoining ends deflected laterally, insulating material embracing one of the rail ends and confined by the lateral deflections of the splice-bars, insulating material between the meeting ends of the rails, and wedge-blocks interposed between the web of the rail and the insulating material confined by the splice-bars.

7. The combination, in an insulated rail-joint, of the meeting ends of the rails, insulating material embracing one of said rail ends, splice-bars connecting the rails and having one end enlarged and angularly recessed to accommodate the insulating material, and angularly-faced wedge-blocks fitting the splice-bars and confining the insulating material in place.

8. The combination, in an insulated rail-joint, of the meeting ends of the rails, insulating material embracing one of said rail ends, splice-bars connecting the rails and having one end enlarged to accommodate the insulating material, wedge-blocks interposed between said insulating material and the web of the rail to confine the insulating material in place and take up the wear at said end of the joint, and means carried by said wedge-blocks and splice-bars for preventing the creeping of the insulating material.

9. The combination, in an insulated rail-joint, of the meeting ends of the rails, insulating material embracing one of said rail ends, splice-bars connecting the rails and having their adjoining ends laterally extended and each provided with an angular recess to accommodate the insulating material, and angularly-faced wedge-blocks confining said insulating material in place, said blocks disposed between the head and base of the rail and having a portion underlying the lateral extensions of the splice-bars.

10. The combination, in an insulated rail-joint, of the meeting ends of the rails, insulating material embracing one of said rail ends, splice-bars connecting the rails and having one end enlarged to accommodate the insulating material, wedge-blocks interposed between said insulating material and the web of the rail to take up the wear at said end of the joint, and projections carried by said wedge-blocks to displace a portion of the insulating material and prevent the creeping of the same, said splice-bars having recesses receiving such displaced portions.

11. The combination, in an insulated rail-joint, of the splice-bars each having adjoining ends directly engaging one of the rails, lateral extensions at the opposite adjoining ends of said splice-bars, each having angular faces, wedge-blocks fitting the space between said lateral extensions and the other meeting end of the rail and engaging the head and base of said rail end, and insulating material between said wedge-blocks and the lateral extensions of the splice-bars, the wedge-blocks having angular faces underlying the lateral extensions of the splice-bars and serving to relieve the strain on the bolts.

In testimony whereof I have signed my name to this specification in the presence of two subscribing witnesses.

GEORGE W. WHITEMAN.

Witnesses:
MURRAY C. BOYER
JOS. H. KLEIN.